(12) United States Patent
Deperraz

(10) Patent No.: US 9,086,166 B2
(45) Date of Patent: Jul. 21, 2015

(54) SHAPE MEMORY ALLOY ACTUATED VALVE ASSEMBLY

(75) Inventor: Nicolas Deperraz, Bons En Chablais (FR)

(73) Assignee: FLUID AUTOMATION SYSTEMS SA, Versoix (CH)

( * ) Notice: Subject to any disclaimer, the term of this patent is extended or adjusted under 35 U.S.C. 154(b) by 68 days.

(21) Appl. No.: 14/124,170

(22) PCT Filed: Jun. 26, 2012

(86) PCT No.: PCT/EP2012/002682
§ 371 (c)(1),
(2), (4) Date: Dec. 5, 2013

(87) PCT Pub. No.: WO2013/000561
PCT Pub. Date: Jan. 3, 2013

(65) Prior Publication Data
US 2014/0103232 A1    Apr. 17, 2014

(30) Foreign Application Priority Data
Jun. 27, 2011    (FR) ..................... 11 55714

(51) Int. Cl.
| | |
|---|---|
| F16K 11/20 | (2006.01) |
| F16K 31/00 | (2006.01) |
| F16K 31/02 | (2006.01) |
| F03G 7/06 | (2006.01) |
| F16K 11/10 | (2006.01) |
| F16K 99/00 | (2006.01) |

(52) U.S. Cl.
CPC .............. *F16K 31/002* (2013.01); *F03G 7/065* (2013.01); *F16K 11/10* (2013.01); *F16K 31/025* (2013.01); *F16K 99/0038* (2013.01)

(58) Field of Classification Search
CPC . F16K 31/002; F16K 31/025; F16K 99/0038; F03G 7/065
USPC ....................... 137/883; 251/129.06
See application file for complete search history.

(56) References Cited

U.S. PATENT DOCUMENTS

| | | | | |
|---|---|---|---|---|
| 4,325,217 | A | * | 4/1982 | Golestaneh ..................... 60/527 |
| 4,544,988 | A | * | 10/1985 | Hochstein ..................... 361/211 |
| 4,716,731 | A | * | 1/1988 | Sakai et al. ..................... 60/527 |
| 4,772,807 | A | * | 9/1988 | Bouvot ......................... 307/119 |
| 4,887,430 | A | * | 12/1989 | Kroll et al. ..................... 60/527 |
| 5,054,522 | A | * | 10/1991 | Kowanz et al. .......... 137/625.33 |
| 6,326,707 | B1 | * | 12/2001 | Gummin et al. ........... 310/12.15 |

(Continued)

FOREIGN PATENT DOCUMENTS

| | | |
|---|---|---|
| DE | 19947324 A1 | 4/2001 |
| EP | 0693406 A2 | 1/1996 |
| GB | 2232245 A | 5/1990 |

*Primary Examiner* — John Fox
(74) *Attorney, Agent, or Firm* — The Ollila Law Group LLC

(57) ABSTRACT

A valve assembly (100) is provided. The valve assembly (100) comprises a housing (102) including a plurality of fluid couplings (103, 104*a*-104*d*). The valve assembly (100) further includes two or more valve members (107*a*-107*d*) movable within the housing (102) between a first position and a second position. A shape memory alloy element (108) is coupled to the two or more valve members (107*a*-107*d*) to independently actuate each of the two or more valve members (107*a*-107*d*) between the first and second positions upon heating a selected portion of the shape memory alloy element (108) above a transformation temperature.

12 Claims, 2 Drawing Sheets

(56) References Cited

U.S. PATENT DOCUMENTS

| | | | |
|---|---|---|---|
| 7,210,315 B2 * | 5/2007 | Castelli | 68/12.18 |
| 7,350,762 B2 * | 4/2008 | MacGregor et al. | 251/11 |
| 7,484,528 B2 * | 2/2009 | Beyerlein et al. | 137/596.17 |

* cited by examiner

SHAPE MEMORY ALLOY ACTUATED VALVE ASSEMBLY

CROSS-REFERENCE RELATED APPLICATIONS

This is a National Stage entry of International Application No. PCT/EP2012/002682, with an international filing date of Jun. 26, 2012, which claim priority of France patent application No. 11/55714, filed Jun. 27, 2011 entitled "SHAPE MEMORY ALLOY ACTUATED VALVE ASSEMBLY".

TECHNICAL FIELD

The embodiments described below relate to, valves, and more particularly, to a valve assembly with a shape memory alloy element capable of independently actuating two or more valves of the valve assembly.

BACKGROUND OF THE INVENTION

Fluid handling devices are becoming increasingly popular and there is an increased demand for fluid handling devices. One type of fluid handling device is an electrically-actuated valve. Electrically-actuated valves are used in a variety of situations to control various types of fluids. Often, electrically-actuated valves are implemented where relatively fast response times are desired or where a fluid-actuated valve cannot be implemented or is not desired. In order for an electrically-actuated valve to be efficient, it should consume minimal power, operate with low noise, and be cost effective to manufacture. In many applications, it is also important that the electrically-actuated valve provide an accurate and consistent fluid distribution.

One type of an electrically-actuated valve that attempts to meet the above criteria is a solenoid valve. Solenoid valves however, are generally limited in size, and in order to obtain adequate performance, a solenoid valve typically consumes a substantial amount of power. The power consumption of a solenoid valve, in some circumstances, is unacceptable. Furthermore, in some applications, it may be desirable to retain the valve in a specific open or mid-point position. If this position requires continuous actuation of the solenoid, the valve will likely consume a substantial amount of power thereby increasing the cost associated with operating the valve. In addition, solenoid valves are often expensive, large, and sometimes create an audible clicking noise as they are actuated that may be undesirable. Furthermore, the electromagnetic field generated by the solenoid valve can present problems in certain environments.

Another solution has been the use of shape memory alloys that transform shape and/or size when heated. Shape memory alloy actuated valves provide an advantage over the previously mentioned prior art solution as they can typically be manufactured smaller and generally consume less power than solenoid-actuated valves. Although shape memory alloy actuated valves provide an adequate solution for single valve systems, prior art approaches have required an excessive number of parts when incorporated into a valve assembly including two or more valves. This is because in the past, each individual valve of a valve assembly required its own shape memory alloy element to actuate the valve. This configuration results in an excessive number of parts and a complex assembly process that is difficult to automate.

Therefore, there is a need in the art for a shape memory alloy actuated valve system with a reduced number of parts that can be made cheaper and more efficient. The embodiments described below overcome these and other problems and an advance in the art is achieved.

SUMMARY OF THE INVENTION

A valve assembly is provided according to an embodiment. The valve assembly comprises a housing including a plurality of fluid couplings. According to an embodiment, the valve assembly further comprises two or more valve members movable within the housing between a first position and a second position. According to an embodiment, the valve assembly further comprises a shape memory alloy element coupled to the two or more valve members to independently actuate each of the two or more valve members between the first and second positions upon heating a selected portion of the shape memory alloy element above a transformation temperature.

A method for independently actuating a valve of a valve assembly is provided according to an embodiment. The valve assembly includes a shape memory alloy element coupled to two or more valve members movable within a housing between a first position and a second position. According to an embodiment, the method comprises a step of heating a portion of the shape memory alloy element proximate a valve member of the two or more valve members to be actuated above its transformation temperature while the remainder of the shape memory alloy element remains below the transformation temperature.

Aspects

According to an aspect, a valve assembly comprises:
 a housing including a plurality of fluid couplings;
 two or more valve members movable within the housing between a first position and a second position; and
 a shape memory alloy element coupled to the two or more valve members to independently actuate each of the two or more valve members between the first and second positions upon heating a selected portion of the shape memory alloy element above a transformation temperature.

Preferably, the valve assembly further comprises two or more electrical contacts in contact with the shape memory alloy element.

Preferably, each of the two or more valve members is coupled to the shape memory alloy between two electrical contacts.

Preferably, the two or more electrical contacts are energized to thermoelectrically heat a portion of the shape memory alloy between the two electrical contacts above its transformation temperature to independently actuate the valve member between the two electrical contacts towards the second position.

Preferably, the valve assembly further comprises a sealing diaphragm coupled to each of the valve members.

Preferably, the valve assembly further comprises a biasing member coupled to each of the valve members to bias the valve member towards the first position.

According to another aspect, a method for independently actuating a valve of a valve assembly including a shape memory alloy element coupled to two or more valve members movable within a housing between a first position and a second position comprises a step of:
 heating a portion of the shape memory alloy element proximate a valve member of the two or more valve members to be actuated above its transformation temperature while the remainder of the shape memory alloy element remains below the transformation temperature.

Preferably, the heating comprises thermoelectrically heating the portion of the shape memory alloy element by applying a differential voltage between two electrical contacts in contact with the shape memory alloy element.

Preferably, each valve member of the two or more valve members is coupled to the shape memory alloy element between two electrical contacts such that a differential voltage applied between two electrical contacts independently actuates a valve member of the two or more valve members.

Preferably, a sealing diaphragm is coupled to each of the valve members.

Preferably, the method further comprises a step of biasing each of the valve members towards the first position and wherein the step of heating the portion of the shape memory alloy element above its transformation temperature overcomes the biasing force to actuate the selected valve member towards the second position.

Preferably, the step of biasing comprises coupling a biasing member to each of the valve members.

DETAILED DESCRIPTION OF THE INVENTION

Figure 1:
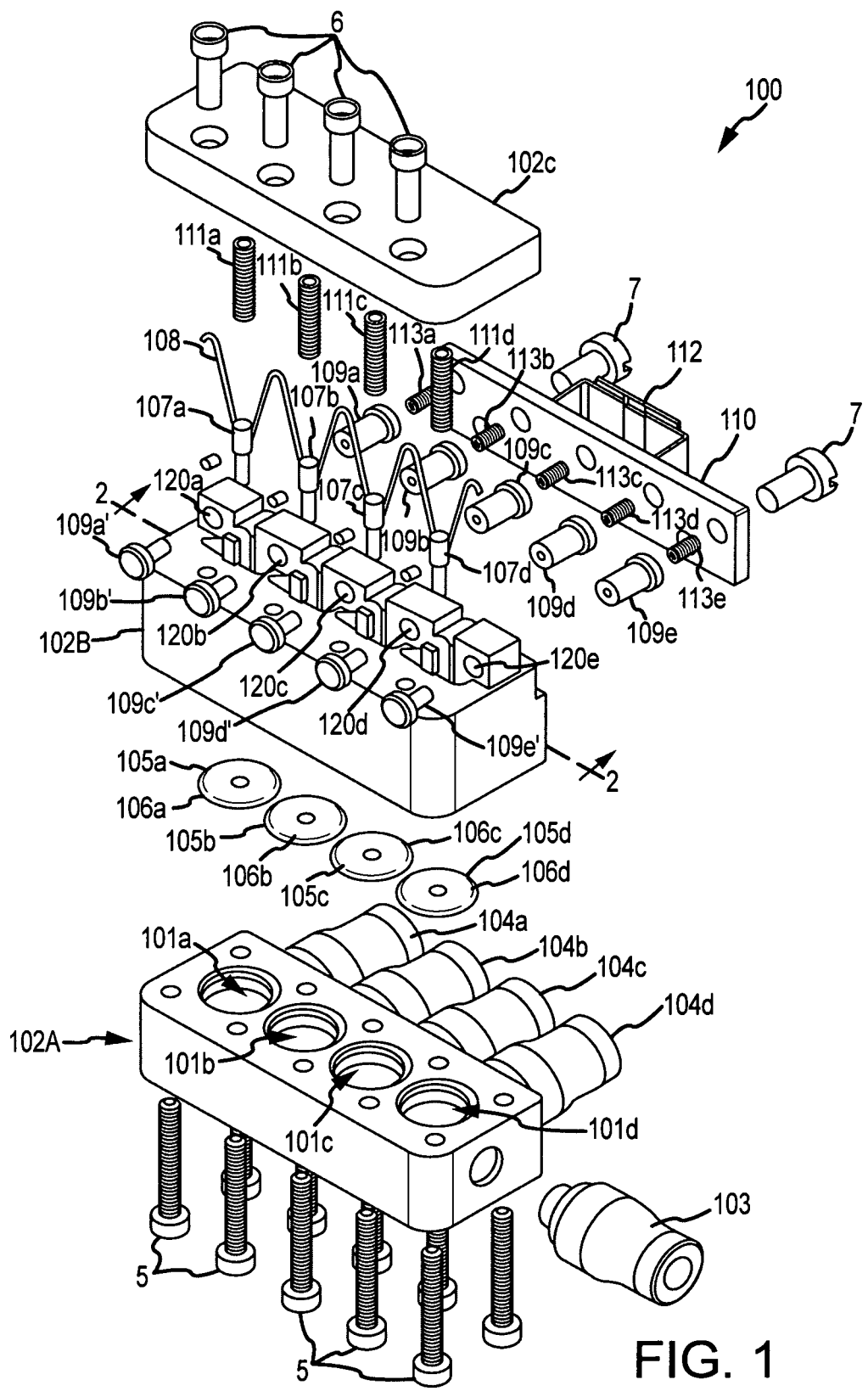
FIG. 1 shows an exploded view of a valve system according to an embodiment.
Figure 2:
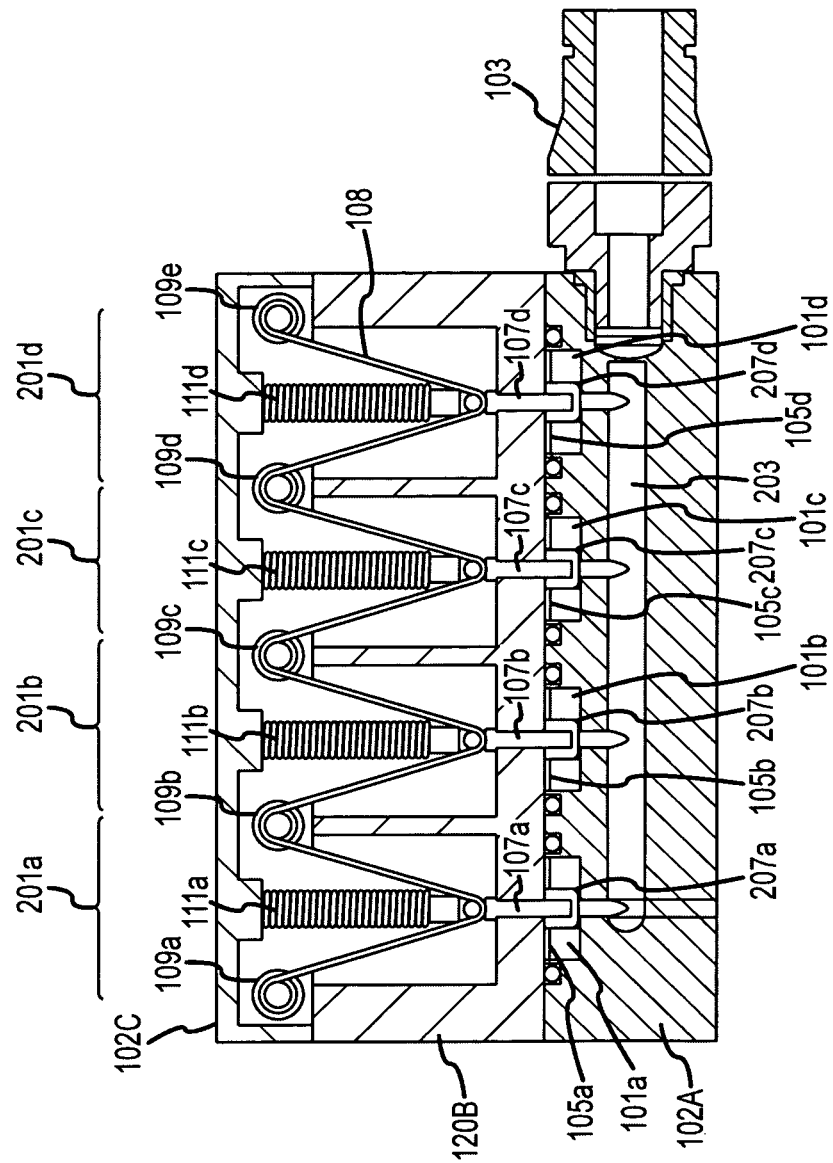
FIG. 2 shows a cross-sectional view of the valve system according to an embodiment.

FIGS. 1-2 and the following description depict specific examples to teach those skilled in the art how to make and use the best mode of embodiments of a valve system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the valve system. As a result, the embodiments described below are not limited to the specific examples described below, but only by the claims and their equivalents.

FIG. 1 shows an exploded view of a valve assembly 100 according to an embodiment. The valve assembly 100 shown in FIG. 1 includes four valve chambers 101a-101d that correspond to individual valves 201a-201d (See FIG. 2) that are joined together to form the valve assembly 100. While the valve assembly 100 includes four valves 201a-201d, it should be appreciated that the valve assembly 100 may include two or more valves and the particular number of valves will vary based on the intended application. The various components of the individual valves are followed by "a, b, c, or d" to indicate with which valve the component is associated. According to the embodiment shown, the valve assembly 100 comprises a housing 102. In the embodiment shown, the housing 102 is separated into three separate pieces 102A-102C that are coupled together to form an assembled valve housing 102. In the embodiment shown, the first and second housing portions 102A, 102B are coupled using a plurality of mechanical fasteners 5. Likewise, the second and third housing portions 102B, 102C are coupled using a plurality of mechanical fasteners 6. However, it should be appreciated that the housing portions 102A-102C can be coupled according to other known methods such as brazing, welding, bonding, adhesives, etc. Therefore, the particular method used to couple the housing portions 102A-102C should in no way limit the scope of the present embodiment. Further, while the housing 102 is shown as comprising three housing portions 102A-102C, it should be appreciated that the housing 102 may comprise any number of portions.

As shown, the housing 102 can receive an inlet fluid coupling 103 and a plurality of outlet fluid couplings 104a-104d. The outlet fluid couplings 104a-104d correspond to each of the plurality of valves 201a-201d. As can be appreciated, each of the fluid couplings 103, 104a-104d can provide fluid ports for the supply and/or exhaust of pressurized fluid. While only a single inlet fluid coupling 103 is shown, it should be appreciated that in alternative embodiments, more than one inlet fluid coupling can be provided. Furthermore, any number of outlet fluid couplings 104a-104d can be provided. Although the fluid couplings 103 and 104a-104d are shown threadedly engaging the housing 102, the fluid couplings 103 and 104a-104d may be coupled to the housing 102 according to other known methods, such as brazing, bonding, adhesives, etc. Therefore, the particular method used to couple the fluid couplings 103 and 104a-104d to the housing 102 should in no way limit the scope of the present embodiment. The fluid couplings 103 and 104a-104d can be further coupled to fluid delivery systems, such as hoses or pipes (not shown), for example. For example, the inlet fluid coupling 103 can receive a pressurized fluid from a pressurized fluid source (not shown) and the outlet fluid couplings 104a-104d can be in fluid communication with one or more components that are selectively provided with the pressurized fluid based on the particular valve actuated. Further, while the fluid couplings 103, 104a-104d are shown extending from the housing 102, in other embodiments, the couplings may be received within the housing 102 to provide the female portion of a coupling.

The valve assembly 100 further includes a plurality of sealing diaphragms 105a-105d. According to an embodiment, the sealing diaphragms 105a-105d can be located between the first and second housing portions 102A and 102B. Each of the sealing diaphragms 105a-105d can include valve seal apertures 106a-106d that can form a substantially fluid tight seal with corresponding valve members 107a-107d. The sealing diaphragms 105a-105d therefore can prevent fluid from reaching the second housing portion 102B. The sealing diaphragms 105a-105d can form a substantially fluid tight seal with corresponding valve seats 207a-207d (See FIG. 2).

According to an embodiment, the valve assembly 100 further comprises a shape memory alloy (SMA) element 108. As can be seen, the valve assembly 100 can include a single SMA element 108 that is capable of independently actuating each of the plurality of valves 201a-201d. This is in contrast to prior art systems that require an individual SMA element for each valve or alternatively, prior art systems with a single SMA element that can only actuate all of the associated valves in unison. It should be appreciated however, that while the embodiment shown includes a single SMA element 108 to actuate all four valves 201a-201d, in other embodiments, a SMA element may be provided to actuate only two valves. For example, a first SMA element may be provided to actuate the first and second valves 201a, 201b while a second SMA element can be provided to actuate the third and fourth valves 201c, 201d. In either embodiment, the SMA elements are capable of independently actuating more than one valve. In other words a single valve or multiple selected valves can be actuated using a single SMA element 108 while other unselected valves remain un-actuated. As shown, the SMA element 108 comprises a wire; however, the SMA element 108 does not have to comprise a wire and other configurations may be used.

The SMA element 108 is shown coupled to each of the valve members 107a-107d. The SMA element 108 may be coupled to the valve members 107a-107d according to a variety of methods, such as mechanical fasteners, friction fit, adhesives, brazing, etc. The particular method used to couple the SMA element 108 to the valve members 107a-107d should in no way limit the scope of the present embodiment. While the valve members 107a-107d are shown as comprising valve plungers, it should be appreciated that the valve members 107a-107d may comprise a variety of different forms, such as poppet members, spools, diaphragms, etc. Therefore, the valve members 107a-107d should not be limited to plunger designs. The valve members 107a-107d can be movable within the housing 102 between a first position and a second position as explained in more detail below.

According to an embodiment, the valve assembly 100 further comprises a plurality of electrical contacts 109a-109e. The electrical contacts 109a-109e can be coupled to the housing 102. For example, the electrical contacts 109a-109e can be received by corresponding apertures 120a-120e formed in the second housing portion 102B. Each electrical contact includes a corresponding retainer 109a'-109e' that engages the electrical contact in order to retain the SMA element 108 on the electrical contacts 109a-109e as well as retain the electrical contacts 109a-109e in the apertures 120a-120e. The retainers 109a'-109e' may engage the electrical contacts 109a-109e in a snap-fit arrangement, for example. The electrical contacts 109a-109e can be further coupled to a printed circuit board (PCB) 110 or the like. According to an embodiment, the electrical contacts 109a-109e can be coupled via a conductive spring 113a-113e. However, other methods for connecting the electrical contacts 109a-109e are contemplated. The PCB 110 can provide electrical energy to the electrical contacts 109a-109e. It should be appreciated that other methods may be used to energize the electrical contacts 109a-109e and therefore, the present embodiment should not be limited to requiring the PCB 110. The PCB 110 may be further coupled to the housing 102. In the embodiment shown, the PCB 110 is coupled to the second housing portion 102B; however, the PCB 110 may be coupled to any of the housing portions. In the embodiment shown, the PCB 110 is coupled to the second housing portion 102B using mechanical fasteners 7. However, it should be appreciated that the PCB 110 may be coupled using other known means. With the electrical contacts 109a-109e coupled to the PCB 110, the electrical contacts 109a-109e can thus provide an electrical as well as mechanical coupling for the SMA element 108. The PCB 110 can include an electrical plug 112 that can receive electrical signals as well as power to operate the valve assembly 100. The electrical plug 112 may be connected to a user interface (not shown), for example, that provides the appropriate actuation signals to actuate one or more of the valves 201a-201d.

Also shown in FIG. 1 is a plurality of biasing members 111a-111d. The biasing members 111a-111d can bias the valve members 107a-107d towards a first position. In one embodiment, the first position can comprise a closed position. In another embodiment, the first position may comprise a valve open position. Therefore, the valves can comprise normally opened or normally closed valves. According to an embodiment, the biasing members 111a-111d can bias the valve members 107a-107d in a direction opposite the direction the SMA element 108 acts on the valve members 107a-107d. For example, if the SMA element 108 actuates the valve members 107a-107d in a second direction to open the valves 201a-201d, the biasing members 111a-111d can bias the valve members 107a-107d in the first direction to close the valves 201a-201d.

FIG. 2 shows a cross-sectional view of the valve assembly 100 taken along line 2-2 in FIG. 1 according to an embodiment. As shown in FIG. 2, the first housing portion 102A includes a fluid passage 203. The fluid passage 203 may comprise an inlet fluid passage that receives pressurized fluid from the inlet fluid coupling 103, for example. According to an embodiment, the fluid passage 203 can be in fluid communication with each of the plurality of valve members 107a-107d. As can be appreciated, the valve members 107a-107d selectively open fluid communication paths between the fluid passage 203 and a respective valve chamber 101a-101d. Each valve chamber 101a-101d leads to a corresponding outlet fluid coupling 104a-104d. In the closed position, i.e., position shown, the sealing diaphragms 105a-105d coupled to the valve members 107a-107d form a substantially fluid-tight seal with a corresponding valve seat 207a-207d to prevent fluid communication between the fluid passage 203 and the valve chambers 101a-101d. The valve seats 207a-207d may be formed in the first housing portion 102A, for example. Alternatively, the valve seats 207a-207d may comprise separate components that can be coupled to the first housing portion 102A. For example, the first housing portion 102A may comprise a hard plastic and it may be desirable to have a valve seat formed from a partially deformable material, such as rubber, for example. Therefore, a valve seat having physical characteristics different from the first housing portion 102A may be coupled to the first housing portion 102A in order to provide a suitable valve seat. According to the embodiment shown, the biasing members 111a-111d can bias the corresponding valve members 107a-107d towards the valve seats 207a-207d to form a substantially fluid-tight seal.

In use, one or more of the valves 201a-201d may be selectively actuated to open a fluid communication path between the inlet fluid coupling 103 and a corresponding outlet fluid coupling 104a-104d. According to an embodiment, the valves 201a-201d may be selectively actuated using the SMA element 108 to move one or more of the valve members 107a-107d from a first position to a second position. As shown and described above, the SMA element 108 is in contact with a plurality of electrical contacts 109a-109e. The SMA element 108 may simply rest on the electrical contacts 109a-109e, or may be wound around or otherwise coupled to the electrical contacts 109a-109e to prevent movement of the SMA element 108 relative to the electrical contacts 109a-109e. For example, if there is a concern that the SMA element 108 may move relative to the electrical contacts 109a-109e during actuation of the valves 201a-201d, the SMA element 108 may be coupled to the electrical contacts 109a-109e using mechanical fasteners, conductive pastes, etc. In the embodiment shown, for example, the SMA element 108 is coupled to each of the electrical contacts 109a-109e.

As shown in more detail in FIG. 2, the SMA element 108 is coupled to a valve member 107a-107d between adjacent electrical contacts 109a-109e. In other words, the SMA element 108 is in contact with an electrical contact 109a-109e on each side of the valve members 107a-107d. For example, the SMA element 108 is in contact with the first electrical contact 109a on a first side of the valve member 107a and is in contact with the second electrical contact 109b on a second side of the valve member 107a. Similarly, the SMA element 108 is in contact with the second electrical contact 109b on a first side of the valve member 107b and is in contact with the third electrical contact 109c on a second side of the valve member 107b. Consequently, with the exception of the end valves 101a and 101d, in the embodiment shown, each valve member shares an electrical contact with an adjacent valve member. It should be appreciated that in other embodiments, each valve member 107a-107d can have its own two electrical contacts. However, the use of shared electrical contacts can reduce the number of components required to make the valve assembly 100.

According to an embodiment, the biasing members 111a-111d provide a biasing force to bias the valve members 107a-107d towards a first position. In the embodiment shown, the biasing force acting on the valve members 107a-107d provides tension to the SMA element 108, which as mentioned above is also coupled to the valve members 107a-107d.

According to an embodiment, a selective portion of the SMA element 108 can be heated in order to independently actuate a selected valve. By "independent," it is meant that the SMA element 108 can actuate the selected valve(s) without actuating the unselected valve(s). Therefore, it should be appreciated that the SMA element 108 may actuate more than one valve 201a-201d at a time. According to on embodiment, the heating of the SMA element 108 can be via thermoelectrically heating; however, the SMA element 108 may be heated by other means, such as a separate heating element. According to the embodiment shown, the electrical contacts 109a-109e can be selectively energized to thermoelectrically heat a selective portion of the SMA element 108 located between adjacent electrical contacts 109a-109e. Thermoelectrically heating the SMA element 108 can be performed by applying a differential voltage between two or more electrical contacts. According to an embodiment, one of the electrical contacts can be at ground or at a negative potential, for example. Shape memory alloys are metals that are generally known for their physical transformation above a transformation temperature. By combining the appropriate alloys, the transformation temperature of the SMA element 108 can be determined. The transformation temperature is generally understood as the temperature at which the SMA material starts to transform from a martensite crystal structure to an austenite crystal structure. When the SMA element 108 is below the transformation temperature, the metal remains in the martensite crystal structure. In the martensite crystal structure, the metal can be physically deformed into a first size and/or shape and can remain in that shape while below the transformation temperature. According to an embodiment, the physical deformation comprises stretching of the SMA element 108 using the biasing members 111a-111d.

Upon heating the SMA element 108 to above the transformation temperature, the SMA element 108 begins to transform into the austenite crystal structure where the alloy returns to its "memorized", pre-deformed, size and/or shape. The transformation that occurs in SMA materials is relatively fast as no diffusion occurs as in many types of phase changes. This unique property of SMA materials can be utilized in the valve assembly 100 in order to selectively open or close individual valves 101a-101d of the valve assembly 100.

As can be appreciated, only the portion of the SMA element 108 that is heated to above the transformation temperature will undergo the transformation. Therefore, by limiting the heating to only a portion of the SMA element 108, a single valve or multiple selected valves can be independently actuated while the remaining valves remain de-actuated. As an example, if a differential voltage is applied between the second electrical contact 109b and the third electrical contact 109c, the portion of the SMA element 108 extending between the two electrical contacts 109b and 109c will be heated via thermoelectric heating while the temperature of the remainder of the SMA element 108 remains substantially unchanged. Consequently, the portion of the SMA element 108 extending between these two electrical contacts will begin the phase change and shrink in size thereby overcoming the biasing force provided by the biasing member 111b. As the biasing force is overcome, the second valve members 107b can be moved within the housing 102 from the first position towards a second position thereby raising the sealing diaphragm 105b away from the valve seat 207b to open the second valve 101b. While the portion of the SMA element 108 between the second and third electrical contacts 109b, 109c overcomes the biasing force of the biasing member 111b, the remaining portions of the SMA element 108 remain below its transformation temperature. Consequently, the remaining valves coupled to the SMA element 108 will remain closed.

Although actuation of the second valve member 107b allows fluid to flow from the fluid passage 203 to the second outlet fluid coupling 104b, the fluid is substantially prevented from flowing towards the SMA element 108 due to the fluid tight seal between the valve member 107b and the sealing diaphragm 105b. Therefore, the life of the SMA element 108 can be extended by being protected from potentially corrosive fluids. Furthermore, the isolation of the SMA element 108 from the fluid prevents heat exchange between the SMA element 108 and the fluid flowing through the valve assembly 100.

According to an embodiment, upon removal of the differential voltage across the two electrical contacts 109b, 109c, the portion of the SMA element 108 between the two electrical contacts 109b, 109c will cool down to below the transformation temperature and allow the biasing member 111b to once again stretch the SMA element 108 to close the second valve 201b.

As can be appreciated, the present embodiment also allows the simultaneous actuation of more than one valve. For example, if the second and fourth valves 201b, 201d are to be actuated, a differential voltage can be applied between the second and third electrical contacts 109b, 109c to thermoelectrically heat the portion of the SMA element 108 extending between the two electrical contacts to actuate the second valve 201b. Another differential voltage may be applied between the fourth and fifth electrical contacts 109d, 109e to thermoelectrically heat the portion of the SMA element 108 extending between the two contacts to actuate the fourth valve 201d. Likewise, if two adjacent valves are to be actuated, for example, the first and second valves 201a, 201b, a differential voltage can be applied between two electrical contacts that are not adjacent one another. For example, a differential voltage can be applied between the first electrical contact 109a and the third electrical contact 109c. This differential voltage results in the entire portion of the SMA element 108 that extends between the first and third electrical contacts 109a, 109c being thermoelectrically heated. Consequently, both the first and second valves 201a, 201b will be actuated.

While more than one valve member 107a-107d can be actuated simultaneously, the polarity of the signal should be considered to prevent electric current from passing through an undesired section of the SMA element 108. For example, in the above discussion where the second and fourth valves 201b and 201d are actuated, if the wrong polarity is applied between the electrical contacts 109b, 109c or between 109d, 109e, electrical current could be sent between the section of the SMA element 108 extending between the electrical contacts 109c, 109d. Below is one example of the polarities that could be used to actuate various combinations of valves. It should be appreciated that the table below is merely one example and should in no way limit the scope of the present embodiment.

TABLE 1

| Valve(s) Open | | | | Polarity on each contact | | | | |
|---|---|---|---|---|---|---|---|---|
| Valve 201a | Valve 201b | Valve 201c | Valve 201d | 109a | 109b | 109c | 109d | 109e |
| X | | | | + | − | | | |
| | X | | | | + | − | | |
| | | X | | | | + | − | |
| | | | X | | | | + | − |
| X | X | | | + | − | + | | |
| X | | X | | + | − | − | + | |
| X | | | X | + | − | | − | + |
| | X | X | | | + | − | + | |
| | X | | X | | + | − | | + |
| | | X | X | | | + | − | + |
| X | X | X | | + | − | + | − | |
| X | X | | X | + | − | + | + | − |
| | X | X | X | | + | − | + | − |
| X | X | X | X | + | − | + | − | + |

Therefore, as can be appreciated, the embodiments described above can selectively heat different portions of the SMA element 108 in order to independently actuate a given valve(s). If more than one valve needs to be actuated, the SMA element 108 can be simultaneously heated in various portions while other portions of the valve remain below the transformation temperature. By limiting the number of SMA elements 108 required for the valve assembly, the embodiments described therefore can reduce the complexity and number of components required for a SMA actuated valve assembly.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the valve system are described herein for illustrative purposes, various equivalent modifications are possible within the scope of the present description, as those skilled in the relevant art will recognize. The teachings provided herein can be applied to other valve systems, and not just to the embodiments described above and shown in the accompanying figures. Accordingly, the scope of the embodiments should be determined from the following claims.

I claim:

1. A valve assembly (100), comprising:
    a housing (102) including a plurality of fluid couplings (103, 104a-104d);
    two or more valve members (107a-107d) movable within the housing (102) between a first position and a second position; and
    a shape memory alloy element (108) coupled to the two or more valve members (107a-107d) to independently actuate each of the two or more valve members (107a-107d) between the first and second positions upon heating a selected portion of the shape memory alloy element (108) above a transformation temperature.

2. The valve assembly (100) of claim 1, further comprising two or more electrical contacts (109a-109e) in contact with the shape memory alloy element (108).

3. The valve assembly (100) of claim 2, wherein each of the two or more valve members (107a-107d) is coupled to the shape memory alloy (108) between two electrical contacts (109a-109e).

4. The valve assembly (100) of claim 3, wherein the two or more electrical contacts (109a-109e) are energized to thermoelectrically heat a portion of the shape memory alloy (108) between the two electrical contacts (109a-109e) above its transformation temperature to independently actuate the valve members (107a-107d) between the two electrical contacts (109a-109e) towards the second position.

5. The valve assembly (100) of claim 1, further comprising a sealing diaphragm (105a-105d) coupled to each of the valve members (107a-107d).

6. The valve assembly (100) of claim 1, further comprising a biasing member (111a-111d) coupled to each of the valve members (107a-107d) to bias the valve member towards the first position.

7. A method for independently actuating a valve of a valve assembly including a shape memory alloy element coupled to two or more valve members movable within a housing between a first position and a second position, comprising a step of:
    heating a portion of the shape memory alloy element proximate a valve member of the two or more valve members to be actuated above its transformation temperature while the remainder of the shape memory alloy element remains below the transformation temperature.

8. The method of claim 7, wherein the heating comprises thermoelectrically heating the portion of the shape memory alloy element by applying a differential voltage between two electrical contacts in contact with the shape memory alloy element.

9. The method of claim 8, wherein each valve member of the two or more valve members is coupled to the shape memory alloy element between two electrical contacts such that a differential voltage applied between two electrical contacts independently actuates a valve member of the two or more valve members.

10. The method of claim 9, wherein a sealing diaphragm is coupled to each of the valve members.

11. The method of claim 9, further comprising a step of biasing each of the valve member towards the first position and wherein the step of heating the portion of the shape memory alloy element above its transformation temperature overcomes the biasing force to actuate the selected valve member towards the second position.

12. The method of claim 11, wherein the step of biasing comprises coupling a biasing member to each of the valve member.

* * * * *